(12) United States Patent
Fuller et al.

(10) Patent No.: US 8,782,744 B1
(45) Date of Patent: Jul. 15, 2014

(54) MANAGING API AUTHORIZATION

(75) Inventors: Erik J. Fuller, Western Cape (ZA);
Francois N. Daniels, Western Cape
(ZA); Neil A. Eriksson, Western Cape
(ZA)

(73) Assignee: Amazon Technologies, Inc., Reno, NV
(US)

( * ) Notice: Subject to any disclaimer, the term of this
patent is extended or adjusted under 35
U.S.C. 154(b) by 92 days.

(21) Appl. No.: 13/525,097

(22) Filed: Jun. 15, 2012

(51) Int. Cl.
*H04L 29/06* (2006.01)
(52) U.S. Cl.
USPC .................................. 726/3; 709/225; 726/4
(58) Field of Classification Search
USPC .......................................... 726/3, 4; 709/225
See application file for complete search history.

(56) References Cited

U.S. PATENT DOCUMENTS

| | | | | |
|---|---|---|---|---|
| 2004/0243848 | A1* | 12/2004 | Blackburn et al. | 713/201 |
| 2006/0106759 | A1* | 5/2006 | Nemoto et al. | 707/2 |
| 2006/0218285 | A1* | 9/2006 | Talwar et al. | 709/227 |
| 2011/0196914 | A1* | 8/2011 | Tribbett | 709/203 |

OTHER PUBLICATIONS

Diamant, Gali, et al. "itmBench: Generalized API for Internet traffic managers." Global Telecommunications Conference Workshops, 2004. GlobeCom Workshops 2004. IEEE. IEEE, 2003.*

* cited by examiner

*Primary Examiner* — Kambiz Zand
*Assistant Examiner* — Michael Guirguis
(74) *Attorney, Agent, or Firm* — Kilpatrick Townsend & Stockton LLP

(57) ABSTRACT

Multiple variants of an API can coexist through API management by using metadata in a pre-processing and post-processing system to weed out requests to which a client does not have permission and return parameters that do not belong with the API request variant. Metadata is added to request objects such that an instance of a request object may be examined to determine a request handler to properly inspect the request object and recommend further processing or rejection of the instance. Metadata may also be added to a response object created as a result of processing the request object such that a response handler may be identified to ensure the fields match the proper response to the request object. The API may be dynamically managed at the point of request and also at the point of return rather than a statically coded whitelist checked multiple times within the code itself.

24 Claims, 10 Drawing Sheets

MANAGING API AUTHORIZATION

BACKGROUND

Application programming interfaces (API's) allow a customer to interact with a service. As API's evolve, it may be desirable to release features to certain subsets of customers for a beta test or for other special relationships. For example, releasing the features to a subset of customers has been managed by using a whitelist. The whitelist was reviewed at various points of API code during processing of an API request. This whitelist approach can be difficult to scale well, such as when features are large and much checking is done. Using a whitelist can also put the responsibility for managing the restricted API on a developer to manually enforce the restriction.

BRIEF DESCRIPTION OF THE DRAWINGS

Various embodiments in accordance with the present disclosure will be described with reference to the drawings, in which.

DETAILED DESCRIPTION

Figure 1:
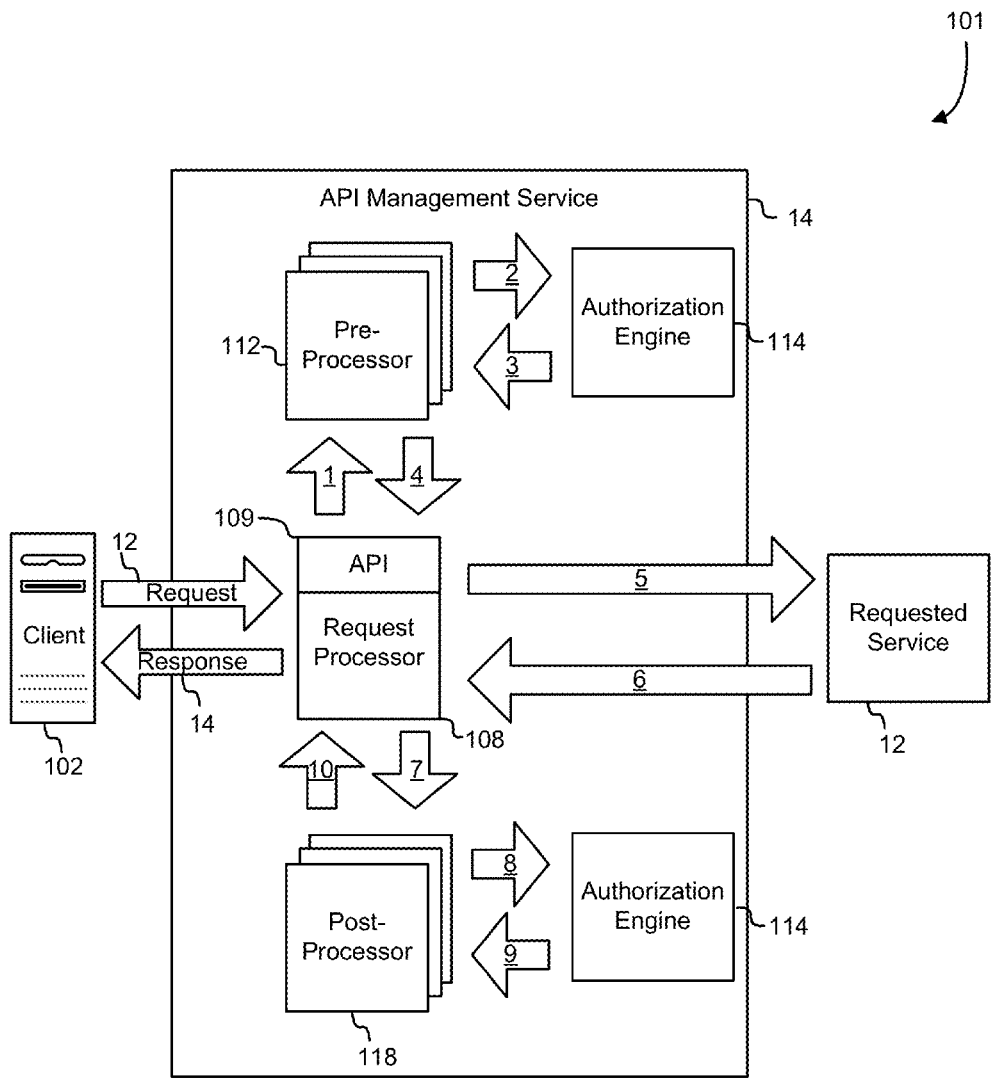
FIG. 1 shows an illustrative example of an environment in which application programming interfaces may be managed in accordance with one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include managing multiple variants of coexisting API's by using metadata in a pre-processing and post-processing system to deny requests to which a client does not have permission and return parameters that do not belong with the API request variant. In one embodiment, metadata may be added to request objects such that an instance of a request object may be examined to determine a request handler to properly inspect the request object and recommend further processing or rejection of the instance. Metadata may also be added to a response object created as a result of processing the request object such that a response handler may be identified to ensure the fields match the proper response to the request object. By using the metadata to identify instances and fields to inspect, the API may be dynamically managed at the point of request and also at the point of return rather than a statically coded whitelist checked multiple times within the code itself.

For example, a client may send a request to an application programming interface (API). A request processor may construct an instance of a request object class based on a variant of the API request received. The instance of a request object class may include request actions and/or request parameters. The request object class may contain metadata, such as an annotation, that identifies a request handler to be used to inspect the instance. In some embodiments, each request type may have a specific request handler. The request handler may be invoked by the request processor and given the instance to inspect. The request handler may use the variant of the request associated with the instance and the client from which the request was received to query a data store as to whether the client has permission to use the variant of the request. In some embodiments, features and fields may also be annotated such that permission granularity may be at the feature and field level rather than a request variant level. If the request handler determines the client does not have permission to make the received request, although valid in syntax, the request may be denied as if the request did not exist. If the request handler determines the client does not have permission to make the request with certain features or fields, although valid in syntax, the request may be denied as malformed. If the request handler determines the client has permission to make the request as received, the request handler may recommend the processing of the request. In this way, the same request can behave differently based on the circumstances under which the request is executed. One advantage of this system may be the handling of identical API calls from different callers in different ways, but keeping this handling hidden from each caller.

After processing the request, information to be returned may be placed in an instance of a response object. The response object may also have metadata that indicates a specific response handler. The indicated response handler may examine the information to return, such as fields, to make sure the returned fields match the expected response given the request, variant and/or features of the API used and/or allowed. The response handler may delete, make null and/or modify data within the response object to ensure a match with the request and permissions of the client. In one embodiment, fields not publicly available are annotated to identify their private nature. Using the annotations and the client information, the response object may determine from a credential store which fields may be returned unmodified, modified or deleted to the client. The response object may then be returned to the client, such as through serializing the response object into XML and sending the XML to the client.

Turning now to FIG. 1, an illustrative example of an environment 101 in which application programming interfaces may be managed in accordance with one embodiment. A client 102 communicates to an API management service 15 to reach a request service 13 using an API call. The API call may have multiple variants that may not be disclosed and/or available to the client 102 performing the request. The API management service 15 may allow an API call variant, deny the API call variant or pretend that an API call variant does not exist depending on whether the API call variant is authorized to be processed in an API call context. The client 102, in one embodiment, may be a computing resource separated from API management service 15 by a network. Requests for the request service 13 may be routed to the API management service 15, which may act as a front end for the request service 13.

In the embodiment shown, the client sends a request 12 to an API management service 15 having an API 109 supported by a request processor 108, the API management service 15 acting on behalf of the request service 13. The request may be a variant of an API call. The request processor 108 may be a set of computing resources configured to receive the request and convert the request 12 into a request instance to be further processed. The request instance may identify an appropriate pre-processor 112 to which the request instance is sent 1. In one embodiment, the request instance is constructed based on the API call variant which includes metadata identifying the appropriate pre-processor 112 to use for that variant. The pre-processor may then use the information contained in request instance and/or the context of the API call variant to determine if the request instance should be processed. In the embodiment shown, the pre-processor consults 2 an authorization engine 114 to determine if the client 102 has permission to use the API call variant. In other embodiments, the context may include time of day, IP address, account type, origin of request, destination of request, hostname or other identifiers that may be extrinsically given or intrinsic to the request. In some embodiments, the pre-processor 112 may calculate or determine the authorization without consulting an authorization engine 114. Once the authorization has been determined, the pre-processor 112 may report 4 the authorization back to the request processor 108. If the request is not authorized, the request processor may send a response 14 that the API call variant does not exist, even if the API call was syntactically correct. Similarly, malformed API call variants may also be denied as non-existent if permission is denied. This provides protection from discovery of API calls to which a client 102 does not have permission to request. However, if the client has permission to make the request using the API call variant, the request may be communicated 5 to the request service 13 for processing The request service 13 may return 6 information about the processing, such as fields that may be placed in a return instance. The return instance may be constructed based on the context of the API call variant and/or request received. In one embodiment, the return instance includes metadata identifying a post-processor 118 that may inspect the return instance. The request processor may allow the post-processor 118 to inspect and alter the return instance to conform to the expectations of the API call variant. In some embodiments, this may include stripping new fields from the return instance that are not expected to be returned to the client. In other embodiments, this may be altering the return instance to conform to the expected return syntax. In one embodiment, the post-processor 118 may consult 8 an authorization engine 114 to determine 9 which fields the client 102 has permission to receive. After the post-processor 118 has completed the inspection, the request processor may receive 10 the return information and provide a response 14 to the client 102 using the return information.

Figure 2:
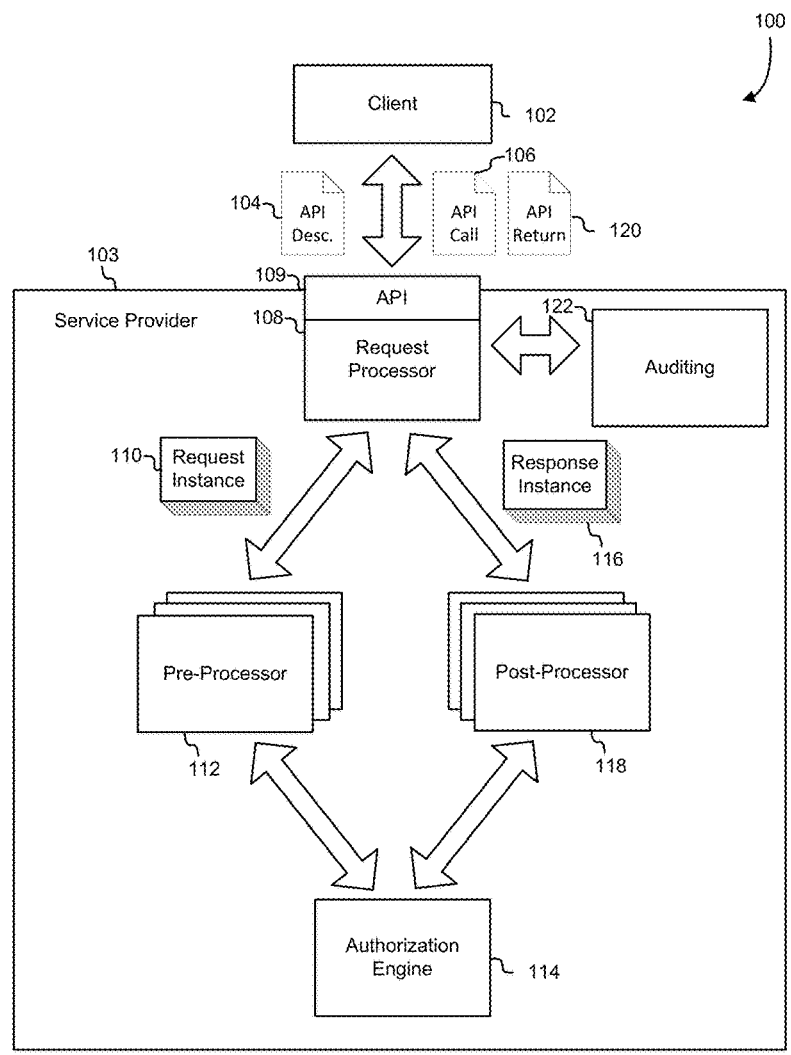
FIG. 2 shows another illustrative example of an environment in which application programming interfaces may be managed in accordance with one embodiment.

Turning now to FIG. 2, an illustrative example of an environment in which application programming interfaces may be managed is shown. As illustrated in FIG. 2, a client 102 communicates electronically with a service provider system 103, referred to simply as a "provider." The client 102, in an embodiment, may be, for example, a computing device separated from the provider by a network. The provider 103 may comprise a collection of networked computing devices collectively configured to respond to and process API requests. The computing devices may include virtual machines and/or hardware machines. A client 102 can request a description of available services from a service provider 103 by requesting a document 104 highlighting API descriptions. In some embodiments, the API description document 104 may be different depending on which features of the API 109 are exposed to the client 102. The client 102 may use the API description document 104 to format and communicate an API call 106 with the service provider 103 through an application programming interface 109. For example, a client may request a web services definition language (WSDL) file from the request processor 108, such as a tomcat server. The tomcat server may determine a client identity (or lack thereof) and use the client identity to return either a WSDL file describing public API requests available, or if determined that a client having non-public API access, the client 102 may receive a description of public and/or non-public API requests. As the WSDL file describes expected input and output parameters, a client may first request the WSDL file and then provide the described parameters in an API call 106, such as a SOAP request. A request processor 108, pre-processor 112, post-processor 118 and Authorization Engine 114 may be, for example, computer programs running on a single computing resource or running on networked computing resources with the ability to pass objects, which may include the request instance 110 and response instance 116. Upon receiving the API call 106, a request processor 108 may create a request instance 110 of a request object class. The request instance 110 may include metadata related to the request object class from which it was formed. The metadata may indicate a pre-processor 112 from a set of pre-processors that may be used to evaluate the request instance 110. The pre-processor 112 may then evaluate the instance to determine the information about the request and the client from which the request came. The pre-processor may use this information to query an Authorization Engine 114, which may be implemented as a database or key value store, to determine if the client has permission to perform the request represented in the request instance 110. The pre-processor may determine if the request is allowed, if the features in the request are allowed and if the fields in the request are allowed. If the request is not allowed, the pre-processor 112 may inform the request processor 108 that the request instance 110 has been refused and a reason for refusing the request instance 110. If the request is allowed, the pre-processor 112 may inform the request processor 108 that the request instance 110 may be further processed. In some embodiments, the request instance 110 may be processed locally by the request processor 108. In other embodiments, the request processor 108 or pre-processor 112 may send information from the request instance 110 to be processed by a third party or other system. For example, the request processor may determine if a client has permission to instantiate a new virtual machine, but once validated, the request to instantiate a new virtual machine may be electronically transmitted to a virtual machine manager. The virtual machine manager may then report back the results of instantiating the virtual machine, such as a hostname and/or IP address.

After processing, a response instance 116 of a response object class may be created to contain the information obtained by processing the request instance 110. The response instance 116 may contain metadata identifying a post-processor 118 to be used in ensuring the response instance 116 conforms to the expectation of the API call 106 and permissions granted to the client 102. The request processor 108 may invoke the post-processor 118. The post-processor 118 may use the response object and client information to query an Authorization Engine 114 as to permissions and information related to response data. Using the permissions and information obtained, the post-processor 118 may verify, modify and/or delete fields and/or data from the response instance 116 as part of the inspection performed by the post-processor 118. Upon completion of the inspection, the response instance 116 may be returned to the request processor 108. The request processor 108 may cause the response instance 116 to be sent to the client 102 as an API return 120, such as through serializing the response instance 116 into XML and returning the XML to the client. The API call 106 and/or successful API return 120 may be reported to an auditing system 122. The auditing system may log, record and assess fees against the client for usage of the API.

There may be multiple ways to instantiate a request instance 110 of a request object. In some embodiments, a request object class may exist for each type of request. For example, a request to instantiate a virtual machine may have its own request object class, while a request to stop a virtual machine may have a different request object class. In other embodiments, a request object class may exist for each variant of a type of request. For example, a request object class may exist for a request to instantiate a virtual machine and a separate request object class may be used for a request to instantiate a virtual machine with a specified amount of memory. In some embodiments, a request object class may represent more than one type of request. For example a single request object class may be used for both instantiating and stopping virtual machines.

Metadata may be used at multiple granularity levels to identify a pre-processor 112. In one embodiment, the metadata is at a class level 112 and each field is examined by the pre-processor. In another embodiment, metadata exists at a class and field level. The class level may be used to identify a pre-processor 112 to inspect the request instance 110 of a request object class. The field level metadata may be used to determine which fields should be examined for permission. In another embodiment, field level or feature level metadata may be used to identify pre-processors that inspect the field or feature to which they are attached. In some embodiments, the metadata is associated with an object class to which instances may also have access. For example, an instance of a Java object may have access to object class information, such as annotations. Thus, instances of response objects may have access to response object class annotations.

Requests may be refused in multiple ways depending on what was not allowed. For example, there may be three ways to determine that a request is not allowed: if the request is not allowed, if the features in the request are not allowed and if the fields in the request are not allowed. In one example, the request is not allowed. Thus it may be desirable to hide the presence of API to the client that made a syntactically correct, but impermissible API call. The request processor 108 may then respond the same as any invalid request. In another example, the features in the request are not allowed. The request processor 108 may then respond as if the requested feature is unknown. In yet another example, the fields in the request are not allowed. The request processor may respond to the impermissible API call by responding that the API call was malformed and that the fields were not understood. By responding in different ways to syntactically correct API calls that are impermissible, the API is responding as expected to the subgroup that does not have access to the extra features and the extra features are hidden from potential probing.

For example, the solution in FIG. 2 may be used to meet a requirement to expose functionality to internal customers while hiding the functionality entirely from non-whitelisted accounts, all within a single API. This environment can allow introduction of new input and output parameters to existing API calls as well as creating new API calls. For non-whitelisted accounts, the experience may be seamless. More specifically, if a non-whitelisted account specifies a new call or new input parameter, a response is given that their request is invalid with UnknownOperation or UnknownParameter as if the call or parameter did not exist. Responses are also modified to ensure that a new field is not returned.

In one embodiment, Java annotations are added to request and response classes, designating specific fields as restricted fields. Annotations on request handlers are also present to indicate which requests were restricted requests. These annotations are then associated with a pre-processor and post-processor, which are used by the API management environment to validate input parameters and filter output parameters. If an API request comes through with parameters for which a caller does not have permission, the request is rejected as invalid. If a response is generated which contains restricted fields, the restricted fields are set to null prior to generating a response, effectively hiding the null field existence from the caller.

In another embodiment, this approach may be extended to incorporate different classification mechanisms other than pure whitelisting. For example a combination of API variant and whitelisting restriction may be used, allowing newer API variants to accept parameters from all customers while previous API variants still validate a caller against a whitelist. For example, this duality enables a private (or beta/limited) API release and a subsequent public API release of a specific feature while still using the same call paths and objects. This duality is advantageous because prior workarounds could be complex or messy, such as exposing preview endpoints and only giving the URL to select customers.

Figure 3:
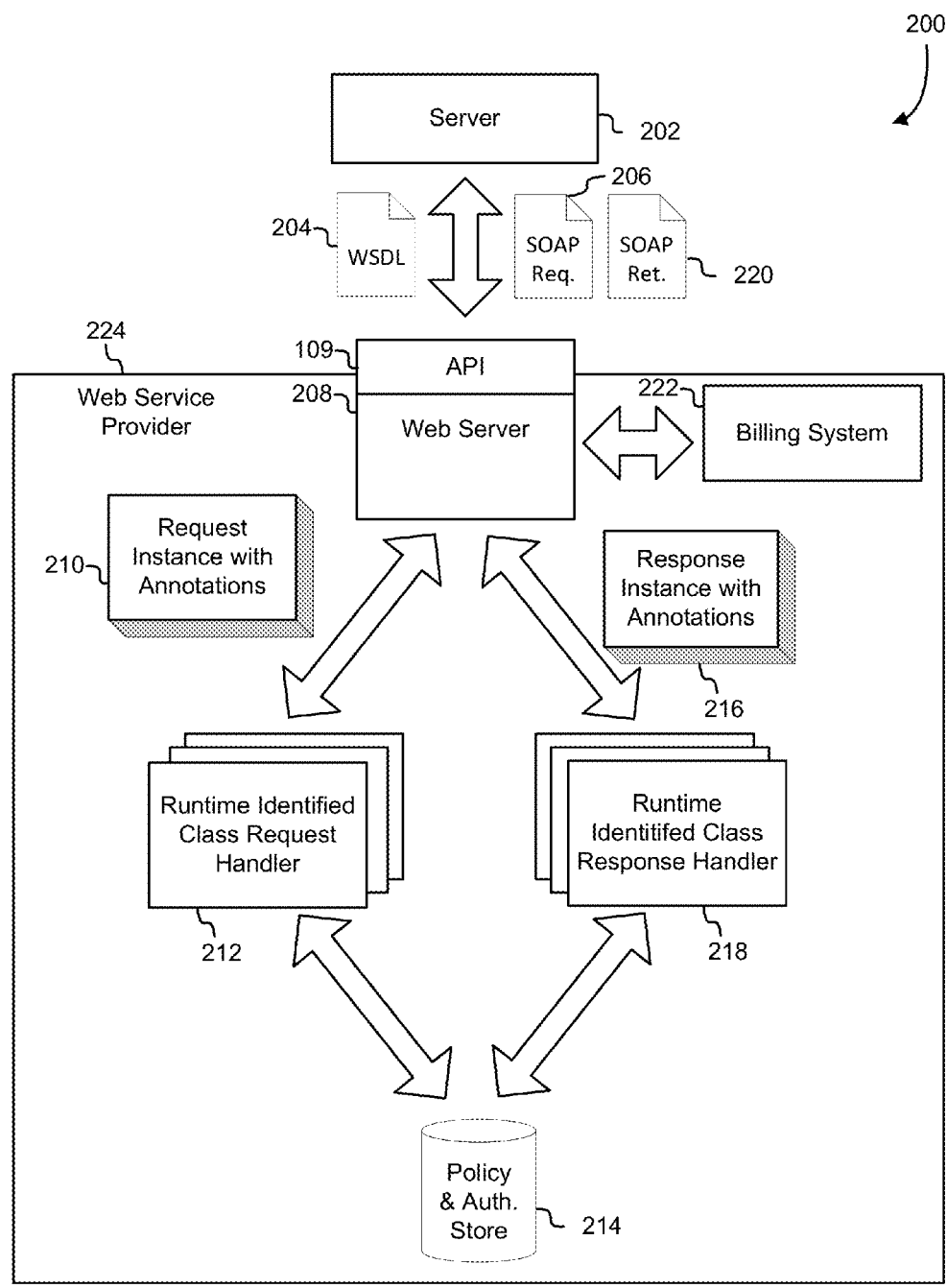
FIG. 3 shows an illustrative example of a managed application programming interface using a web interface in accordance with one embodiment.

Turning now to FIG. 3, an illustrative example of a managed application programming interface using Java in accordance with one embodiment is shown. A server 202, such as a virtual machine, in a datacenter may communicate with a service provided by a program execution service 224 over a network. The program execution service may use a webserver, such as tomcat server 208 configured with an API 109 to receive and respond to requests, such as SOAP requests 206. The tomcat server 208 may instantiate programs, such as Java servlets, to produce instances of a Java request instance 210, request handler 212, Java response instance 216 and response handler 218. These programs may be instantiated on the same Tomcat server 208 or on other servers configured to communicate with the tomcat server 208. In the embodiment shown, a server 202 may request a web services definition language (WSDL) file 204 from a Tomcat server 208 in a program execution service 224 describing the API 109 services available. The server 202 provides a SOAP (originally simple object access protocol) request to an API 109 of the tomcat server 208. The SOAP request 206 may be stored in an instance 210 of a request object written in Java. The Java request object class may include annotations that identify a class to execute, such as "com.company.request.Handler." As the annotations are text, the request handler 212 may be identified and bound at runtime rather than at compile time and dynamically loaded at runtime. The tomcat server 208 may inspect the Java request instance 210 for the annotation indicating the runtime class of the request handler 212 and invoke the request handler 212. The request handler may then query a key value store 214, such as a database, credential store or other storage, using the client information, from the SOAP request 206, and the Java request instance 210 to determine the API permissions granted to the client. Fields that are annotated with permission information may be checked against the key value store 214. For example, a field that allows a client to request a solid state drive as part of the hardware of a request to instantiate a virtual machine may be annotated as "VM Beta." If the client does not have "VM Beta" permissions and requests a solid state drive, the request may be refused. If the client has permission to make the request including the features and fields within the request, the request handler 212 may approve the Java request instance 210 for further processing. The tomcat server 208 may send the Java request object information to a third party service for further processing (such as through another SOAP request) or process the Java request object internally.

Upon completion of the further processing, the tomcat server 208 may have an instance 216 of a Java response object with information relating to the result of the processing of the Java request instance 210. The Java response instance 216 may also include annotations inherited from the Java class from which it was instantiated. The annotations may identify a response handler 218, such as by the class name, that may be bound dynamically at runtime. Using the Java response instance 216, the response handler 218 may query a key value store 214 for client permissions related to the Java response instance 216. The response handler 218 may then determine with the permissions which fields and features may be deleted, modified or passed back to the client untouched. In some embodiments, the fields may have annotations that identify non-public API fields. These annotations may be used with the key value store 214 to determine which fields must be altered or removed. Upon finishing the inspection of the Java response instance 216, the response handler 218 may return the Java response instance 216 to the tomcat server 208. The tomcat server 208 may then serialize the Java response instance 216, such as into XML, for a SOAP response 220 and return the SOAP response 220 to the server 202. The tomcat server 208 may also inform a billing system 222 of API usage by the server 202, such that the usage may be assessed against a client.

Binding at runtime may provide multiple benefits. For example, underlying support classes may be altered without serious disruption of services. New support for requests, handlers and other API management may be added by including annotations specifying the new support. The binding at runtime may also allow the construction of the API permissions separate from the coding of the API. Construction of the API may proceed without mixing permissions with operation of the API.

Figure 4:
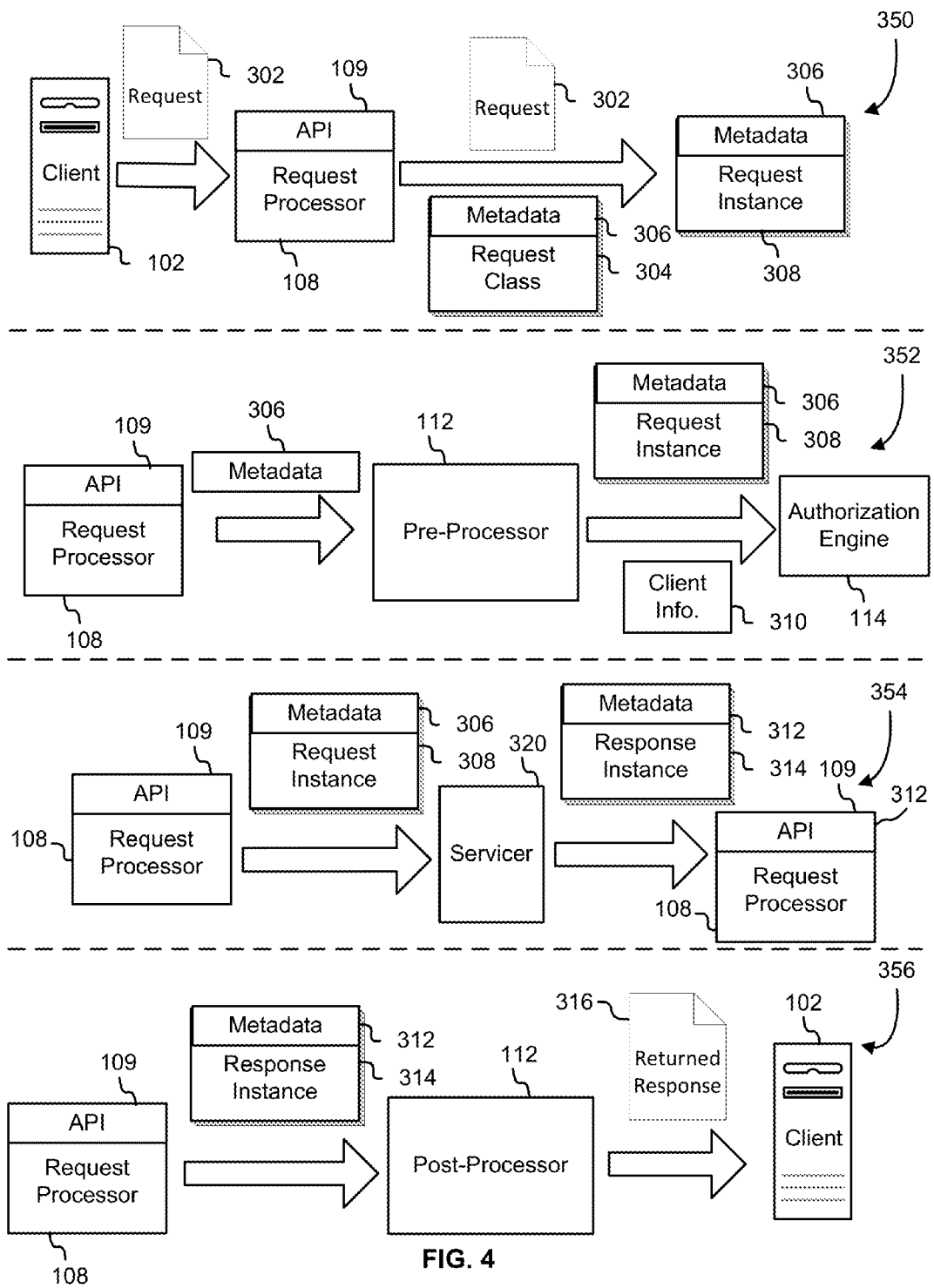
FIG. 4 shows an illustrative example of communication during application interface management in accordance with one embodiment.

Turning now to FIG. 4, an illustrative example of communication during application interface management in accordance with one embodiment is shown. Application interface management may include four phases: request construction 350, request validation 352, request processing 354 and response cleaning 356. In request construction 350, a client request 302 is formed into a request instance 308. For example, the client request 302 may be a SOAP request and the request instance 308 may be an instance of Java class object. In the embodiment shown, a client 102 may provide a request 302 to a request processor 108 through an API 109. Using the request 302, a request class 304 is selected to instantiate a request instance 308. The request class 304 contains metadata 306 that is accessible to the request instance 308 because the request instance 308 is an instance of the request class 304.

During the request validation phase 352, a pre-processor 112 is dynamically identified that will validate that the client has permissions to use the functionality in the request instance 308. For example, the pre-processor 112 may be a Java class that is dynamically loaded at runtime based on an annotation in the request instance 308 identifying the classpath of the pre-processor 118. In the embodiment shown, the request processor 108 uses the metadata 306 associated with the request instance 308 to determine a pre-processor 112 to perform an inspection on the request instance 308. Using the request instance 308 and client information 310, which may or may not be in the request instance 308, the pre-processor 112 may query an Authorization Engine 114 to determine if the client 102 has permission to process the request instance 308. If the client does not have permission to request the functionality in the request instance, the pre-processor 112 may inform the request processor 108 that the request 302 has been refused. However, if after the inspection, the pre-processor 112 determines the client 102 has permission to process the request instance 308, the pre-processor may inform the request processor 108 that the request instance 308 may be processed.

During the request processing phase 354, the request instance 308 is processed and a response instance 314 is formed based on the processing of the request instance 308. The request processor 108 sends the request instance 308 to a servicer 320 to process the request instance 308. In some embodiments, the request instance 308 is sent directly to be processed by the pre-processor 112 and the pre-processor 112 acts as the intermediary rather than the request processor 108. The servicer 320 may return information to the request processor 108 that resulted from the processing of the request instance 308. The returned information may be a response instance 314 or it may be instantiated into a response instance 314 by the request processor 108. The response instance 314 may also contain response metadata 312 inherited from a class upon which it was instantiated.

During the response cleaning phase 356, the request processor 108 determines a post-processor 112 from metadata within the response instance 314 to ensure the returned response 316 to the client is consistent with the client permissions and API 109. The request processor 108 may inspect the response instance 314 for metadata that identifies a post-processor 112 to dynamically execute. The request processor 108 may send the response instance 314 to the post-processor 112 for inspection. The post-processor 112 may determine an appropriate returned response 316 to the client 102 by examining client permissions from the Authorization Engine 114 and the response instance 314. In one embodiment, fields requiring special permissions are annotated, which may be used to query the Authorization Engine 114. Using the result of the query, the post-processor 112 may delete, modify or leave fields and/or features to include in the returned response 316. Once the inspection is complete by the post-processor 112, the post-processor 112 or the request processor 108 may create a returned response 316 to send to the client. In some embodiments, the returned response is the result of serializing the response instance 314 into XML and returning the XML as a SOAP object to the client 102.

Figure 5:
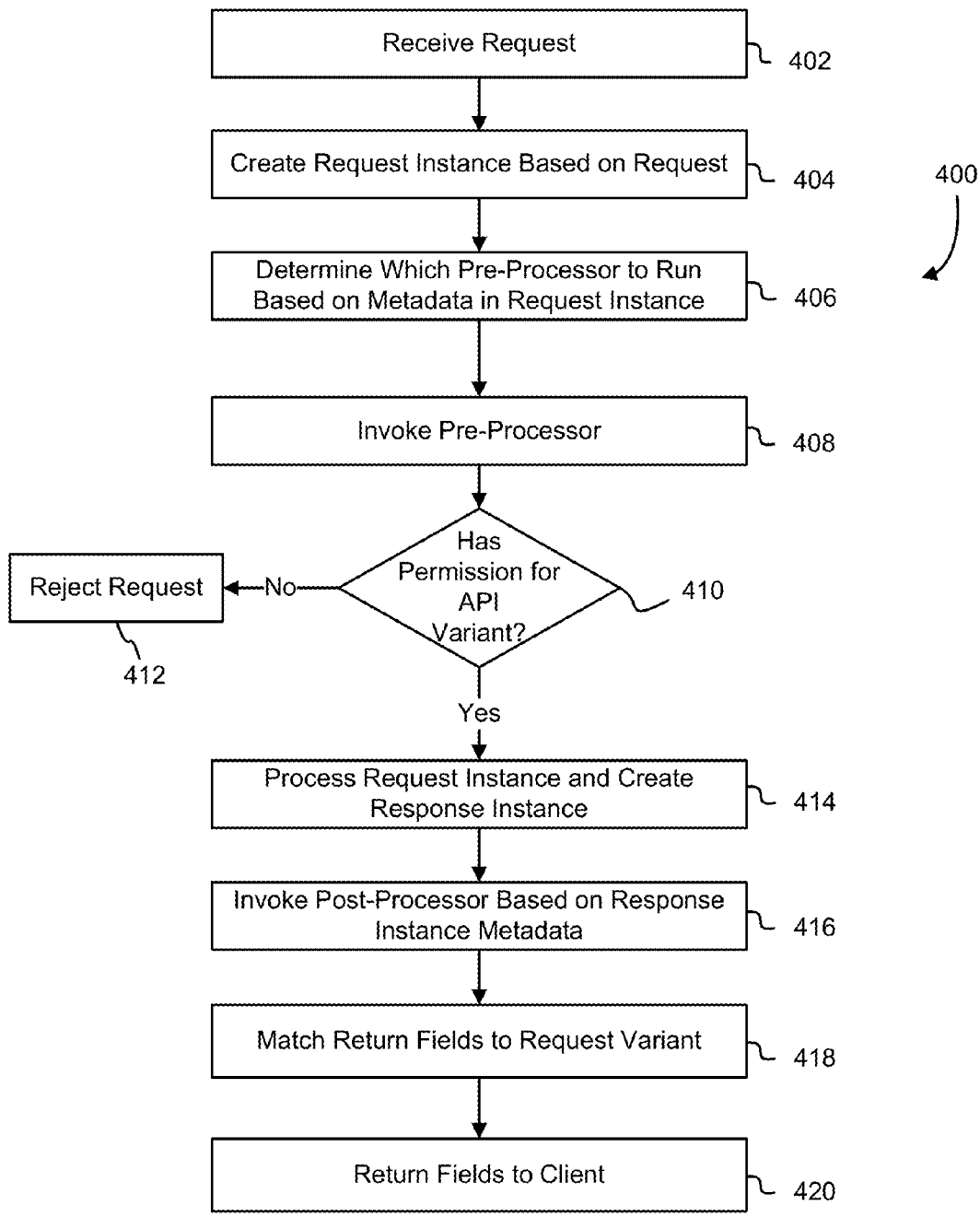
FIG. 5 shows an illustrative example of a process that may be used to manage application programming interfaces in accordance with one embodiment.

Turning now to FIG. 5, an illustrative example of a process 400 that may be used to manage application programming interfaces in accordance with one embodiment is shown. The process may be accomplished by the request processor 108, request instance 110, pre-processor 112, response instance 116 and post-processor 118 as seen in FIG. 2. In the embodiment shown, the request processor 108 may receive 402 a request from a client 102 through an API. A request instance 110 is created 404 based on the request. Using the metadata stored in the request instance 110, a pre-processor 112 is determined 406 for inspecting the request instance 110. The pre-processor 112 is invoked 408 to inspect the request instance 110. If the client does not have 410 permission to use the API variant in the request, the request may be rejected 412. If the client has 410 permission to use the API variant, the request instance 110 may be processed 414 and a response instance 116 may be created based on the information returned from the processing. Using metadata from the response instance 116, a post-processor 118 may be invoked 416 to inspect the response instance 116. The post-processor 118 may match 418 return fields in the response instance 116 to the request variant and client permissions which may include querying the Authorization Engine 114. The response object may be serialized and the fields returned 420 to the client 102.

Some or all of the process 400 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory. Some of the operations disclosed in the process may be performed in serial or parallel.

It should be recognized that a version may not only be viewed as a numbered selection of code, but also as a configuration. For example, a version of an API call may include one parameter while another version of the same API call may include two parameters.

Figure 6:
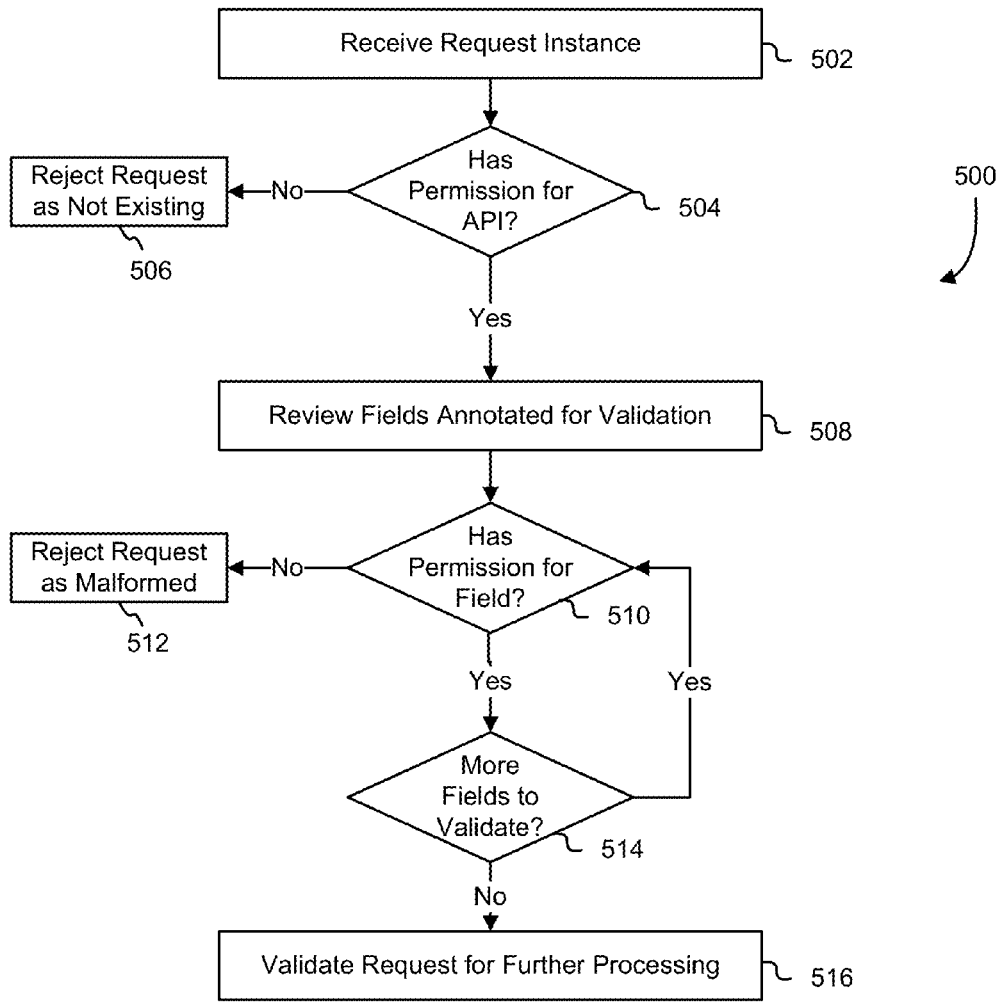
FIG. 6 shows an illustrative example of a process that may be used in the pre-processing stage of managing application programming interfaces in accordance with one embodiment.

Turning now to FIG. 6, an illustrative example of a process 500 that may be used in the pre-processing stage of managing application programming interfaces in accordance with one embodiment. The pre-processing may be performed by the pre-processor 112, request instance 110 and request processor 108 as seen in FIG. 2. In the embodiment shown, upon being invoked, the pre-processor 112 receives 502 the request object. The pre-processor may determine 504 if the client has permission to use the API by querying an Authorization Engine 114. If not, the pre-processor may reject 506 the request as if the API were not in existence. However, if the 102 client has permission, the fields contained in the request, such as parameters, may be reviewed for validation. In some embodiments, the non-public fields are annotated so that the pre-processor 112 may review 508 the fields for permission without reviewing every field. If the client does not have 510 permission for a field, the request may be rejected 512 as malformed. If the client has 510 permission for each field and there are no more fields to validate 514, the request instance 110 may be validated 516 for further processing.

Figure 7:
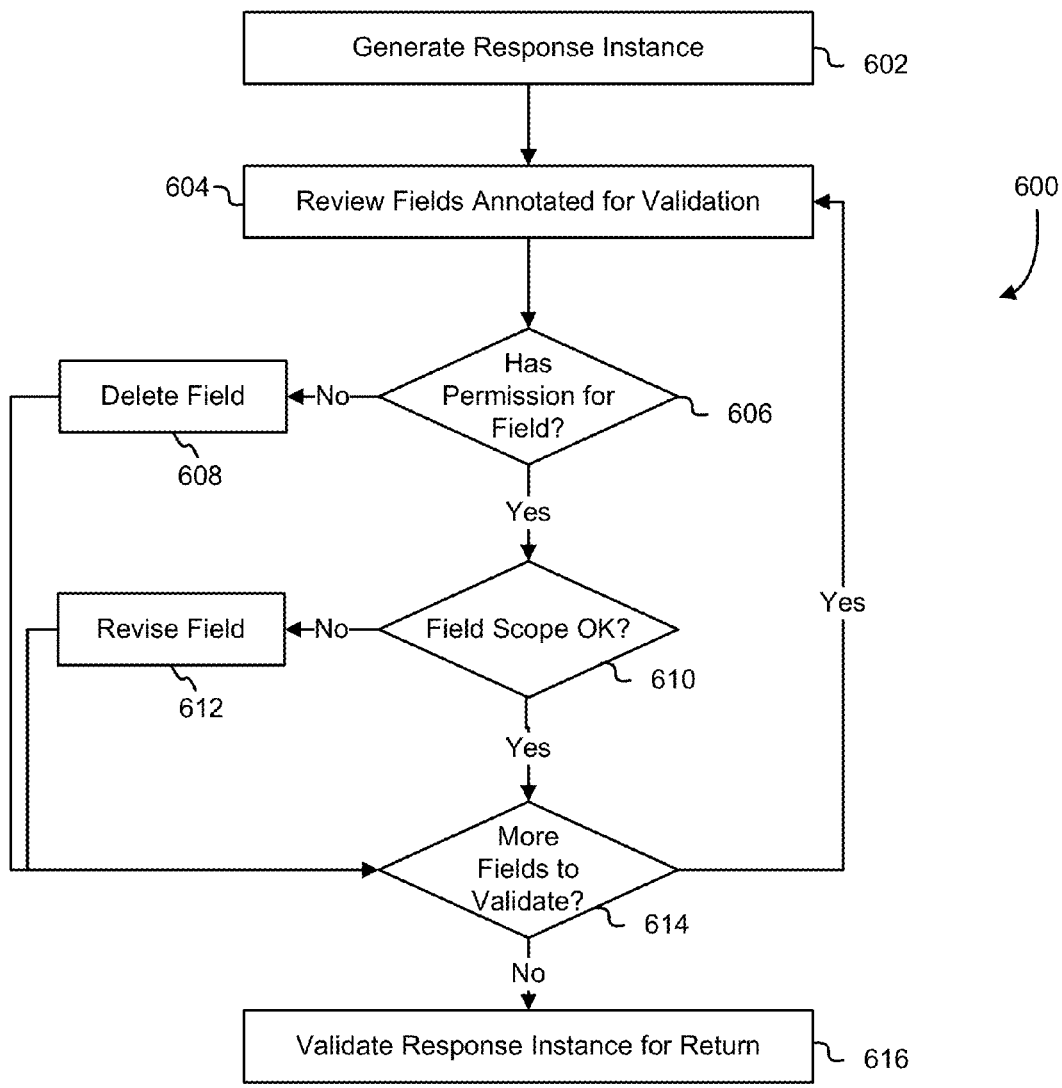
FIG. 7 shows an illustrative example of a process that may be used in the post-processing stage of managing application programming interfaces in accordance with one embodiment.

Turning now to FIG. 7, an illustrative example of a process 600 that may be used in the post-processing stage of managing application programming interfaces in accordance with one embodiment is shown. The process may be accomplished by the post-processor 118, response instance 116 and request processor 108 as seen in FIG. 2. In the embodiment shown, the post-processor 118 receives 602 a response instance to review 604 for validation. If a client 102 does not have 606 permission to receive a field, the field may be deleted 608 and if more fields are left to validate 614, the fields may be reviewed 604. If a client 102 does not have permission to receive 610 a field in the current scope, such as in metric units instead of imperial units, the field may be revised 612 and if more fields are left to validate 614, the fields may be reviewed 604. After all fields have been reviewed 614, the response instance 116 may be validated 616 for return to the client 102.

Figure 8:
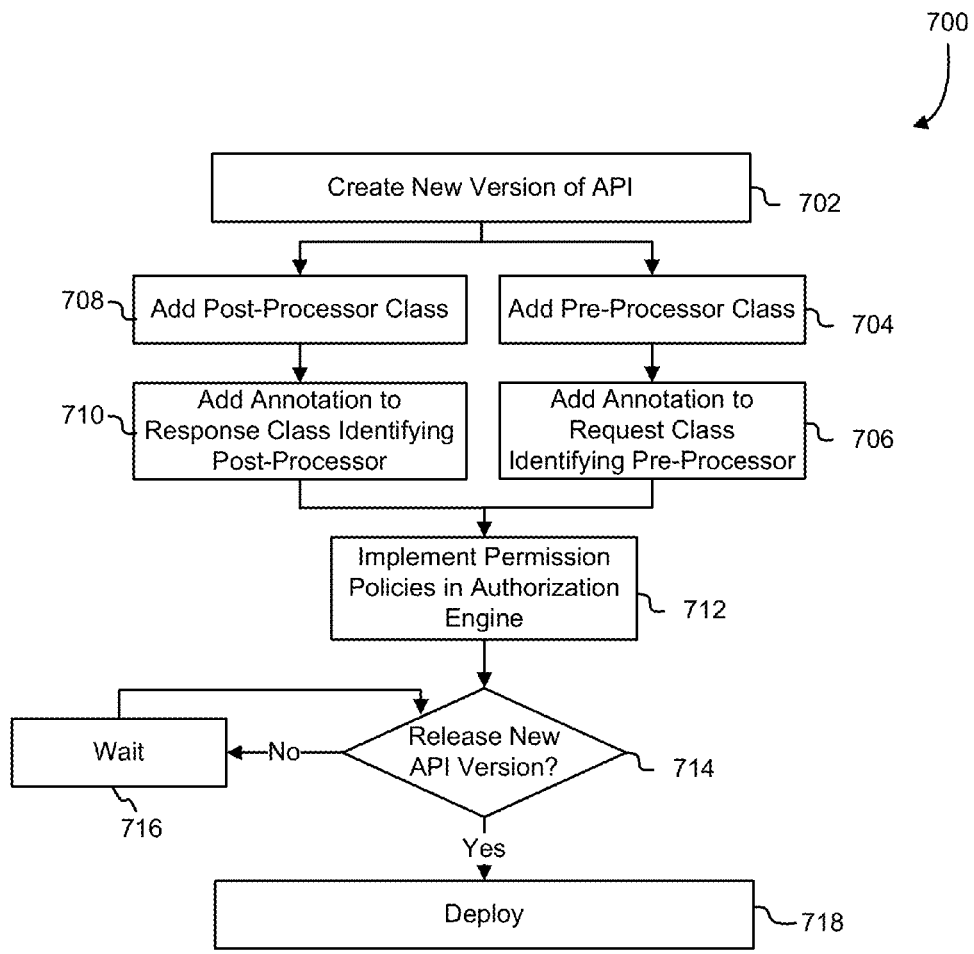
FIG. 8 shows an illustrative example of a process that may be used in the setup of managing application programming interfaces in accordance with one embodiment.

Turning now to FIG. 8, an illustrative example of a process that may be used in the setup of managing application programming interfaces in accordance with one embodiment is shown. The process 700 may be accomplished by pre-processor 112, or post-processor 118 within the service provider 103 environment. A new variant of an API may be created 702, such that it should be managed by an API management system. Pre-processor 112 classes may be added 708 to the service provider 103 to service the new API. Post-processor 118 classes may also be added 704 to the service provider 103 to service the new API Annotations may be added 706 and 710 to support classes and fields being inspected by the post-processor 118 and pre-processor 112. The API variant and client permissions may be added 712 to a database or data store for determining which clients may have access to the API variant. If the API is not ready to release 714, the system may wait 716. Otherwise, the new classes may be enabled 718 and the API variant released to those with permission.

Figure 9:
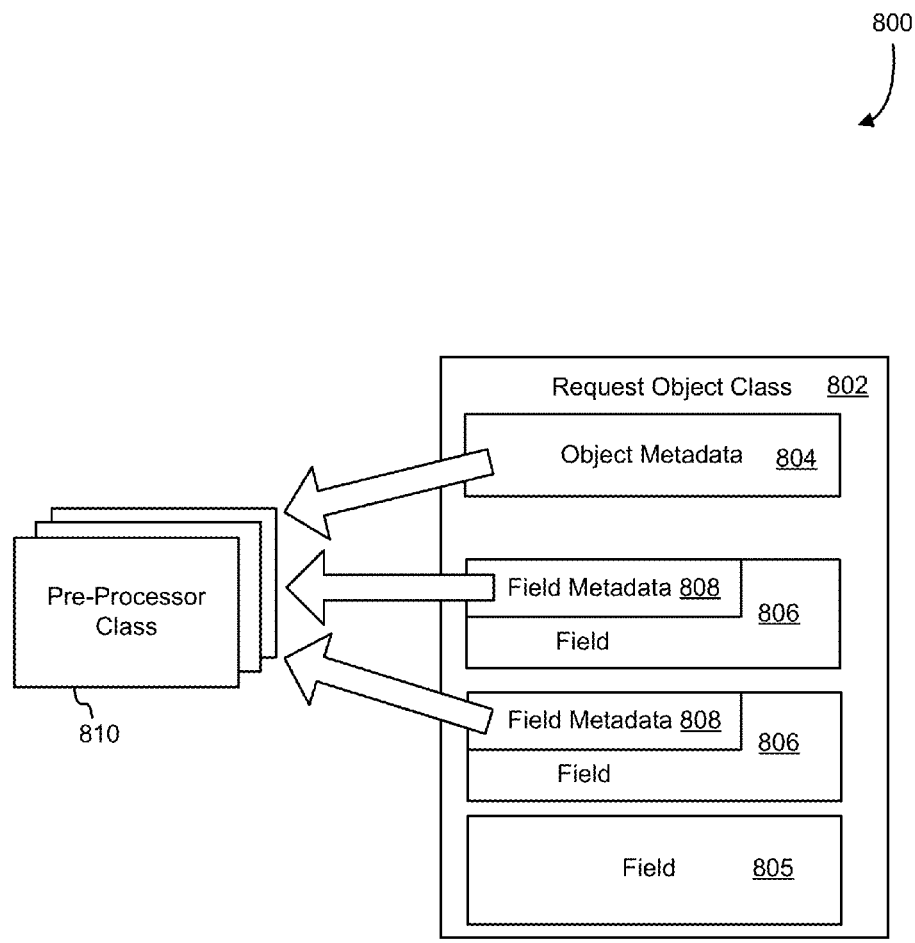
FIG. 9 shows an illustrative example of a request object class referencing a pre-processor class in accordance with one embodiment.

Turning now to FIG. 9, an illustrative example of a request object class referencing a pre-processor class in accordance with one embodiment is shown. A request object class 802 may include object level metadata 804, public fields 805, non-public fields 806, and field level metadata 808. In the embodiment shown, non-public fields 806 are associated with field metadata 808 that identify a pre-processor class 810 that is configured to inspect and determine if the field is permissibly used by a client. The object metadata also identifies a pre-processor class 810 that can determine if an instance of the request object class represents an API call permissibly used by a client. For example, metadata may contain a class name that may cause the identified pre-processor class 810 to be dynamically loaded and executed. In other embodiments, the field metadata 808 does not point to a class, but indicates a permission that must be held by a client. The object metadata identifies the pre-processor class 810 that should be executed and inspect the permissions indicated by the field metadata 804.

Figure 10:
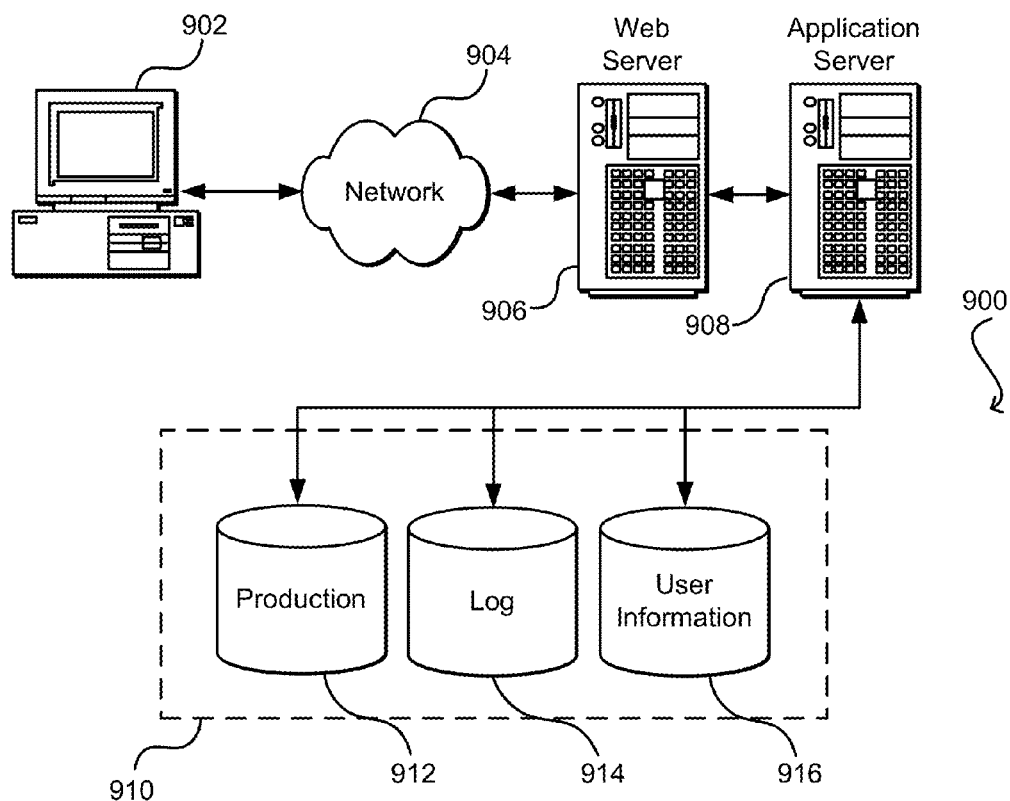
FIG. 10 illustrates an environment in which various embodiments can be implemented.

FIG. 10 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases, or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 900 in FIG. 10 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for managing API access, comprising:
  under the control of one or more computer systems configured with executable instructions,
    receiving, from a client, a variant of a request through an application programming interface, the application programming interface supporting multiple variants of the request;
    constructing a request object based at least in part on the variant of the request, the request object having first metadata dynamically identifying a pre-processor to invoke before processing the request;
    invoking the pre-processor based at least in part on the first metadata;
    determining, by the pre-processor, whether the client has permission to use the variant of the request;
    when the pre-processor determines that the client has permission to use the variant of the request:
      processing the request object;
      reviewing a plurality of non-public fields contained in the request object;
      validating the plurality of non-public fields contained in the request object; and
      forming a return object based at least in part on the variant of the request and the plurality of non-public fields, the return object having a plurality of return fields and second metadata indicating a post-processor to invoke before processing the request;

invoking a post-processor based at least in part on the second metadata;

processing, by the post-processor, the plurality of return fields to be consistent with the variant of the request; and communicating the plurality of return fields to the client.

2. The computer-implemented method of claim 1, further comprising:

receiving, from the client, a second variant of the request through the application programming interface;

constructing a second request object based at least in part on the second variant of the request, the second request object having third metadata indicating a second pre-processor to invoke before processing the second request object;

invoking the second pre-processor based at least in part on the third metadata, the second pre-processor configured to determine if the client has permission to use the second variant of the request;

rejecting the second variant of the request that is properly formed but lacking permission as if the second variant of the request were improperly formed.

3. The computer-implemented method of claim 1, further comprising:

receiving, from a second client, the variant of the request through the application programming interface;

constructing a second request object based at least in part on the variant of the request, the second request object having the first metadata indicating the pre-processor to invoke before processing the second request object;

invoking the pre-processor based at least in part on the first metadata to determine if the client has permission to use the variant of the request;

as a result of the pre-processor determining that the client lacks permission to use the variant of the request, rejecting the variant of the request that is properly formed but lacking permission as if the second variant of the request were improperly formed.

4. The computer-implemented method of claim 1, wherein invoking the post-processor further comprises retrieving information from the second metadata identifying, at runtime, the post-processor to execute.

5. The computer-implemented method of claim 1, wherein invoking the pre-processor further comprises retrieving information from the first metadata identifying, at runtime, the pre-processor to execute.

6. The computer-implemented method of claim 1, further comprising:

preparing a new variant of the request to receive through the application programming interface;

authorizing the client to use the new variant of the request to form assignment information; and providing the pre-processor with access to the assignment information for use in determining if the client has permission to use the new variant of the request.

7. A computer-implemented method for processing requests, comprising:

under the control of one or more computer systems configured with executable instructions, determining a request object including first metadata, the request object associated with a variant and a request;

determining an inspection to perform based at least in part on the first metadata;

inspecting the request object, based at least in part on the determined inspection, to determine if the request is available for processing, the request object having a plurality of non-public fields contained in the request object;

validating that the request is available for processing, based at least in part on the plurality of non-public fields contained in the request object;

as a result of the determining that the request is available for use:

processing the request object;

invoking a post-processor based at least in part on second metadata of a return object formed from the processing the request object, the post-processor processing one or more fields of the return object to be consistent with the variant and the request.

8. The computer-implemented method of claim 7, wherein receiving the request object further comprises receiving a request from a client; and wherein inspecting the request object further comprises determining if the client has permission to use the request associated with the request object.

9. The computer-implemented method of claim 7, wherein the computer systems configured with executable instructions further include a web server.

10. The computer-implemented method of claim 9, wherein the request object is formed from the request that adheres to a specification described in a web services description language file.

11. The computer-implemented method of claim 7, wherein receiving the request object further comprises determining if any variant of the request is available for use by a client associated with the request by comparing the client and request information against a whitelist.

12. The computer-implemented method of claim 7, further comprising assessing a cost to a client based at least in part on processing the request for the client.

13. A computer system for managing request variants, comprising:

one or more computing resources having one or more processors and memory including executable instructions that, when executed by the one or more processors, cause the one or more processors to implement at least:

a pre-processor that performs an inspection on a request object and determines whether the request object represents an authorized request to use a variant of a request represented by the request object based at least in part on the pre-processor validating one or more fields contained in the request object;

a post-processor that inspects proposed return information after processing the request object to ensure the proposed return information is compatible with the variant of the request represented by the request object;

a request processor that receives requests having different variants through an application programming interface, constructing the request object having metadata that dynamically identifies the pre-processor at runtime, providing to the pre-processor the request object to determine whether the request object is authorized to be processed, processing the request object that has been determined to be authorized by the pre-processor and providing the proposed return information from the processing of the request object to the post-processor.

14. The computer system of claim 13, wherein the request processor returns a response that the request is malformed when the request object is not authorized to be processed.

15. The computer system of claim 13, further comprising a data store for storing information associating clients with authorized variants of requests and providing the information to the pre-processor for determining whether the request object represents an authorized request.

16. The computer system of claim 13, wherein the metadata identifies program code of the pre-processor such that the program code of the pre-processor is selected at runtime.

17. The computer system of claim 13, further comprising an accounting system that receives information about the processed request object and assesses a cost to a client associated with the request object for processing the request object.

18. The computer system of claim 13, wherein the proposed return information further comprises metadata, and wherein the metadata identifies program code of the post-processor such that the program code of the post-processor is selected at runtime.

19. One or more non-transitory computer-readable storage media having collectively stored thereon executable instructions that, when executed by one or more processors of a computer system, cause the computer system to at least:
   tag a class of request objects with tag information to identify a request handler to process instances from the class of request objects, the class of request objects supporting multiple variants of a request;
   process a received request using the class of request objects into a client request instance associated with a variant;
   invoke the request handler, based at least in part on the tag information, to process the client request instance to determine if a client is authorized to perform the variant associated with the received request based at least in part on validating one or more fields contained in the client request instance; and
   process the client request instance when the client is determined to be authorized.

20. The non-transitory computer-readable storage media of claim 19, wherein processing the received request further comprises receiving the received request through an application programming interface and storing the received request in a client request instance.

21. The non-transitory computer-readable storage media of claim 19, wherein the instructions further comprise instructions that, when executed, cause the computer system to at least:
   determine the request handler to invoke, at runtime, based at least in part on the tag information of the class of request objects, the tag information dynamically identifying program code to execute.

22. The non-transitory computer-readable storage media of claim 21, wherein the tag information is a programming language annotation that identifies a request handler class to execute for the client request instance built from the class of request objects.

23. The non-transitory computer-readable storage media of claim 19, wherein the instructions further comprise instructions that, when executed, cause the computer system to at least:
   invoke a return handler identified by second tag information of a return object constructed as a result of processing the client request instance, the return handler preparing the return object to be compatible with the variant.

24. The non-transitory computer-readable storage media of claim 19, wherein the tag information is associated with one or more fields within the class of request objects and, for each field having a tag, the request handler verifies permission to use the field.

* * * * *